(12) United States Patent
Fernando et al.

(10) Patent No.: US 9,327,483 B2
(45) Date of Patent: May 3, 2016

(54) POLARIZER DEVICES AND PROCESSES OF MANUFACTURE

(76) Inventors: Primal Fernando, Saratoga Springs, NY (US); Steve Fischer, Berthoud, CO (US)

( * ) Notice: Subject to any disclaimer, the term of this patent is extended or adjusted under 35 U.S.C. 154(b) by 0 days.

(21) Appl. No.: 13/490,382

(22) Filed: Jun. 6, 2012

(65) Prior Publication Data

US 2012/0305523 A1    Dec. 6, 2012

Related U.S. Application Data (60) Provisional application No. 61/493,894, filed on Jun. 6, 2011.

(51) Int. Cl.
    *B32B 38/10*     (2006.01)
    *G02B 5/30*      (2006.01)
    *G02B 5/02*      (2006.01)
    *G02F 1/1335*    (2006.01)

(52) U.S. Cl.
    CPC ............. *B32B 38/10* (2013.01); *G02B 5/0268* (2013.01); *G02B 5/3025* (2013.01); *G02B 5/3058* (2013.01); *G02F 1/133528* (2013.01); *G02F 1/133536* (2013.01); *B32B 2307/42* (2013.01); *Y10T 156/10* (2015.01); *Y10T 156/1039* (2015.01); *Y10T 156/1062* (2015.01)

(58) Field of Classification Search
    None
    See application file for complete search history.

(56) References Cited

U.S. PATENT DOCUMENTS

| | | | |
|---|---|---|---|
| 7,670,758 B2 * | 3/2010 | Wang et al. | 430/321 |
| 2007/0152358 A1 * | 7/2007 | Suganuma | 264/1.31 |
| 2008/0204643 A1 * | 8/2008 | Sasada | 349/117 |
| 2009/0046362 A1 * | 2/2009 | Guo et al. | 359/486 |

* cited by examiner

*Primary Examiner* — Jiong-Ping Lu
(74) *Attorney, Agent, or Firm* — Karish & Bjorgum, PC (57) ABSTRACT

A simple and innovative process for manufacturing a high performance mechanical polarizing device is provided. The invention utilizes an inexpensive, high output production process where a transparent film substrate is coated with a non-transparent layer by deposition or other wet or dry method. Then a photoresist or a nano-imprint lithography process is used to overlay the non-transparent coated film with a pattern. The exposed non-transparent material is then removed by means of acid or base etching or the use of other mechanical or nano-technology removal methods. The photoresist is then removed and a protective layer may then be applied to the polarizer substrate. According to another embodiment, nano-imprinting techniques are used to prepare the polarizer substrate. The process may be automated in one or more embodiments, and lends itself to a high speed production manufacturing line, utilizing roll-to-roll, sheet fed or other methods of automated manufacturing.

48 Claims, 5 Drawing Sheets

POLARIZER DEVICES AND PROCESSES OF MANUFACTURE

BACKGROUND OF THE INVENTION

Polarizers play an important role in directing or rearranging light and are used in numerous applications from photography to liquid crystal displays (LCDs). Consumer demand for products that use polarizers has created an aggressive and competitive marketplace for manufacturers of large and small LCD devices, aircraft windows, medical imaging equipment, solar energy collectors and other applications not yet realized. In relation to LCDs, the performance of a polarizer determines not only the amount of transmitted light that reaches the viewer, but also the contrast of the viewing platform. The materials and costs related to manufacturing these polarizers result in a high cost to the buyer. In an effort to achieve an edge in the market, manufacturers are continually looking for lower cost polarizer components and construction and fabrication methods without sacrificing quality and performance.

"Absorptive" polarizers, i.e., a linear polarizer where the unwanted polarization states are absorbed by the device are known in the art. A typical "absorptive" polarizer is usually structured in layers comprised of two protective films, two sheets of triacetate cellulose (TAC), one layer of polyvinyl alcohol (PVA), an iodine complex, and several surface treatments and adhesive layers. The most common absorptive polarizer is a "wire grid" polarizer which consists of a plurality of a parallel array of metal wires on a transparent substrate, typically glass or clear polymer film, placed in a plane perpendicular to the incident beam. The grid consists of both a metal medium (the conductor) and a dielectric. How the wire grid polarizer affects light, depends on the size of the grid and the width and pitch of the conductor and dielectric mediums, as well as the thickness of the substrate.

Most polarizers are comprised of many layers which are susceptible to de-lamination caused by moisture and/or heat, as well as the aging process often associated with typical non-wire grid polarizers. The layers are produced utilizing chemical compounds which may have negative effects on the environment. In addition, the current manufacturing processes result in a very low production yield of approximately 70%. Therefore, there is a need for a polarizer with less environmental impact in the manufacturing process and a higher production yield.

In the second quarter of 2009, the largest market share of the global polarizer market is the thin film transistor liquid crystal display (TFT-LCD) sector at 95%. Of this, 57% of the TFT-LCD market was for LCD TV-use polarizers. Other uses within this sector are computer monitors, mobile phones, video game systems, navigation systems, projectors and many more.

Most polarizers are woefully inefficient and in an LCD application allow too much light to pass through, requiring the use of other layers to further reduce the amount of transmitted light. Therefore, there is also a need for a more efficient, durable and reliable polarizer that is capable of controlling the passage of light without the vulnerabilities and high costs associated with the use of multiple layers of films and substrates.

SUMMARY OF THE INVENTION

The polarizers and manufacturing processes described herein satisfy the above-described industry needs. According to the present invention, a mechanical polarizing device and the manufacturing process thereof are provided. The mechanical polarizer filters light in a highly efficient and economical manner equal to wire grid polarizers. The more economical, high performance, environmentally friendly mechanical polarizer device and manufacturing process described herein have significant benefits to manufacturers and consumers alike.

The polarizers produced according to the present invention are less expensive to produce and more effectively and efficiently control the transmittance of light, thereby eliminating the need for some of the additional layers within a liquid crystal device is provided. The polarizers and manufacturing processes described herein will accordingly reduce the manufacturing cost of liquid crystal devices, thus benefiting manufacturers and consumers. Further, a more efficient polarizer as described herein will also allow the use of a smaller or less intense back-light source which in turn will not only reduce the amount of heat generated by the device, but will also consume less energy, resulting in a device having overall greater energy efficiency and lower environmental impact (i.e., reduced carbon footprint).

The polarizer produced according to the present invention is produced with less toxic chemical elements than currently in use, thus reducing the overall environmental impact of polarizer production. The polarizers produced with the manufacturing processes described herein have no size limitations, unlike standard wire grid polarizers, and the process generates a higher quality and greater production yield. In addition, the polarizers produced as described herein are produced at a lower cost than a typical absorptive polarizer. In addition, the process produces a product with no or fewer adverse toxic impacts on the environment than current production methods.

Accordingly, the present invention addresses problematic issues relating to the standard polarizers currently in use by electronics manufacturers.

FIGURES

These and other features, aspects and advantages of the present invention will become better understood from the following description, appended claims, and accompanying figures where like numbers reference like elements and where:

DESCRIPTION

According to one embodiment of the invention, a process for manufacturing a Polarizer Device 100 is described.

Figure 1:
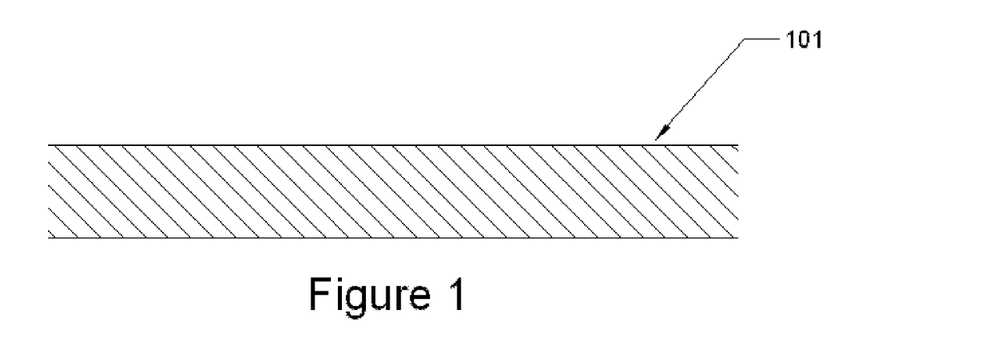
FIG. 1 is a cross sectional view schematically showing a structure of a transparent layer, to which the invention is applied.

Referring now to FIG. 1, according to one embodiment, first, the manufacturing process starts with selecting a First Transparent Layer 101. The First Transparent Layer 101 is a film substrate which is substantially transparent for the desired use. A variety of suitable materials comprise polymeric materials such as plastic polymers, acrylate polymers, acrylics, acrylonitrile butadiene styrene, cellulose ethers, cellulose esters, thermoplastic elastomers, ethylene ethyl acrylate copolymers, ethylene vinyl alcohol copolymers, glass, thermoplastic resins, polyolefins, polyacrylics and polyacrylates, ionomers, linear long-chain diols, methyl methacrylate styrene copolymers, methacrylate butadiene-styrene copolymers, polycarbonates, polyether, polyketones, polyethylenes, poly sulfides, polysulfones, polylactones, polyurethanes, polyetherketones, polyamides, polyesters, polyarylene oxides, polyarylene sulfides, polyetherimides, polyethylene terephthalate, polyepichorohydrins, polytetrafluoroethylenes, polyacetals and silicones.

The choice of the First Transparent Layer 101 is made after considering economical and environmental impact, purpose of use, and the layers of the material on which the Polarizer Device 100 will be placed.

Figure 2:
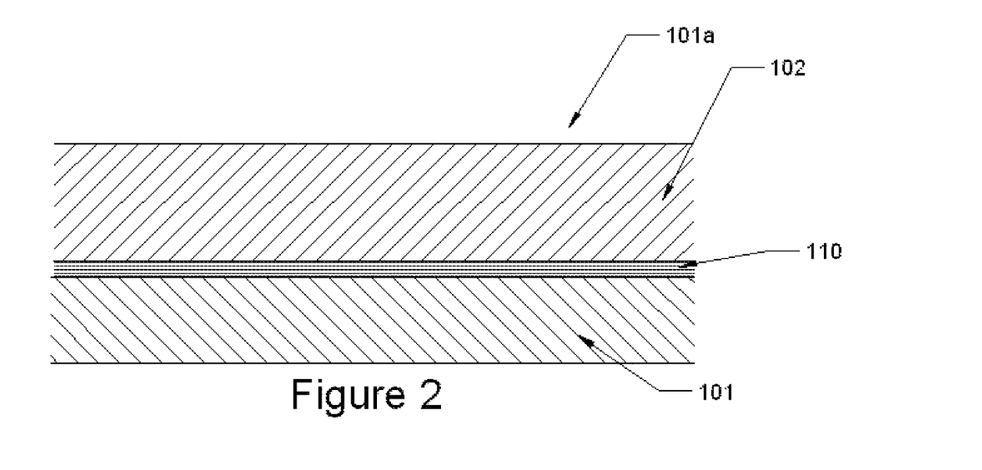
FIG. 2 is a cross sectional view schematically showing a structure of a non-transparent substrate layer applied to a transparent substrate with an adhesive, to which the invention is applied.

Referring now to FIG. 2, after the First Transparent Layer 101 is selected, the First Transparent Layer 101 is coated with a transparent adhesive 110. Next, a Non-Transparent Material layer 102 is deposited on the First Transparent Layer 101. The Non-Transparent Material 102 may be deposited on the First Transparent Layer 101 by one of, but not limited to the following methods: vacuum deposition, ambient air process, or pressure process methods. The Non-Transparent Material 102 may also be deposited onto the First Transparent Layer 101 using a plasma or sputtering method or the deposition may be solution coated. Preferably, the height of the Non-Transparent Material layer 102 is about 80 nm (i) or the height is optimized at a different measurement for different wavelengths of light or other uses. However, 180 nm is the preferred optimal height for the polarizer in the visible light spectrum.

Examples of the Non-Transparent Material layer 102 include, but are not limited to aluminum, copper, gold, nickel, and/or silver, or other suitable conductive non-transparent materials. Conducting polymers may also be used including, but are not limited to polyacetylene, polyaniline and polythiophene.

An additional option is utilizing the process of depositing the Non-Transparent Material grid 106 directly on the First Transparent Layer 101 with Nano-Imprint Lithography or laser nano-fabrication. Current technology can produce 5 nm resolution, which is considered too large for chip manufacturing, but for the purpose of the present invention, a 60 nm resolution may be used to make the grid pattern, making the current resolution of nano-Imprint Lithography an appropriate application of the technology. Nano-Imprint Lithography or nano-fabrication saves several steps, simplifying the process by saving the time and complexity of installing the mask 103, etching the Non-Transparent Material from the First Transparent Layer 101, and thus the removal of etched material, as well as neutralizing the etching process and removing the photoresist 103.

Figure 7A:
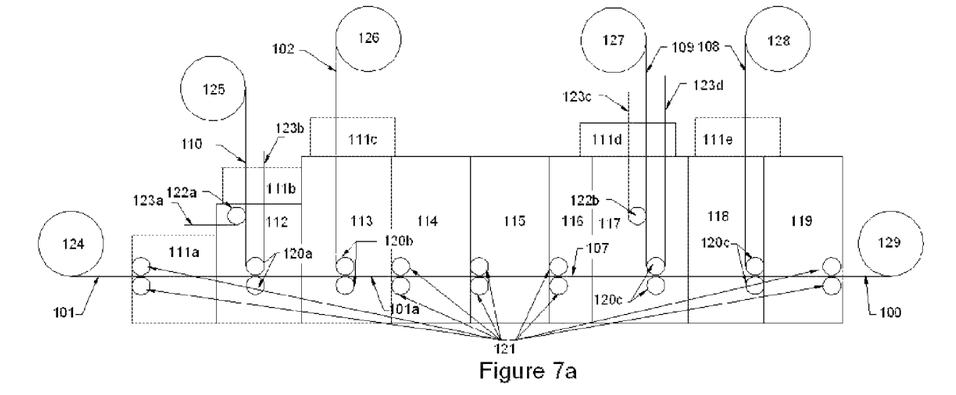
FIG. 7a is High Speed Roll to Roll Nano-Etching Polarizer Assembly and Manufacturing Process of the Channel Grid type polarization element, to which the invention is applied.

There are several photoresist materials including, but not limited to polymethyl methacrylate, polymethylglutarimide and Phenol formaldehyde resin which may be suitably used according to the present invention. A pre-made photoresist 103 or the use of Nano-Imprint Lithography will put a negative image of the grid pattern on the Non-Transparent Material layer 102. This pattern 103 (showing holes in photoresist) will produce the grid dimensions that are needed to produce an economically viable etched Channel Grid Polarizer. (As seen in FIG. 7a). The photoresist will have an alternating 73 nm to 84 nm open gap (ii) and a 60 nm covered gap (iii). The gap can be from 73 nm to 84 nm and will give the polarizer a period of 124 nm to 144 nm (iv). This dimension is optimal for a visual light polarizer wavelenth between 400 nm to 700 nm The 180 nm Non-Transparent Material height and the 60 nm width will give a heighth to width ratio of 3 to 1. This ratio can be varied for different polarizing effects. By varying the ratio and dimensions this process can be utilzed to process different light in other wavelengths.

Nano-Imprint Lithography or Nano-Colloidal Lithography processes may also be used to place the grid pattern onto the substrate. In Nano-Imprint Lithography, the substrate with the Non-Transparent Material coating would be coated with a light sensitive chemical photoresist. Then a polarizer pattern would be shone onto the photoresist. The light provided from a UV, DUV, or mercury-vapor lamp, would be concentrated onto the uncured chemical resist. The light will harden the negative image on the substrate, by means of cross-linking the photoresist material. The portion that was not hardened may be washed off. This leaves the substrate ready for the next step in the process.

Laser nano-fabrication methods may be adapted to this process and used to print long continuous channel patterns at high speed which may in turn increase the quantity and volume of channel material produced.

With the photoresist pattern 103 in place on Non-Transparent Layer 102 the next step is to remove the unwanted Non-Transparent Material 104. Several different methods may be chosen to remove the Non-Transparent Material to produce the Channel Grid Structure, including but not limited to the use of a variety of liquids to etch or break the bond of the Non-Transparent Material 104 from the substrate 101a, such as acids and bases.

There are also other methods like reactive ion etching to remove the unwanted Non-Transparent Material 104.

The different processes for Non-Transparent Material removal can be broken down into three major types.

Wet Etching. This includes such methods as Isotropic Etching, Anisotropic Etching, Electrochemical Etching, and HF Etching (also known as Hydrofluoric acid Etching), HF Vapor Etching Dry Etching. This includes such methods as Vapor Etching, Plasma Etching, Reactive Ion Etching (RIE), Deep Reactive Ion Etching (DRIE), Ion Beam Etching, Argon Ion Beam Accelerator, Micro-Electro-Mechanical-Systems (MEMS), Nano-Electro-Mechanical-Systems (NEMS)

Mechanical Removal. This includes such methods as a modified process of Micro Machining, advancements in Nano Machining), Femtosecond Laser Nano-machining, and the use of Precision Focused or Interference Focused High Powered Lasers and Laser Arrays The next step is to remove the photoresist 103 from the Polarizer Device 100 comprising the First Transparent Layer/

Non-Transparent Material 101a. This process is predicated on the type of photoresist 103 used in the process. Some need strong chemicals or solvents like acetone, or carbon tetrachloride. Others can be removed by radiation like strong UV, or Gama Rays or other methods.

The next step is to clean and remove any leftover Non-Transparent Material 104, photoresist 103, or cleaning solvents. This will be in preparation for installation of the adhesive 109 and protective substrate coating 108 on the Channel Grid Structure side of the film 107. This protective substrate coating 108 will serve two purposes. First, it will secure the Channel Grid Structure 107 so it will not be damaged if it is struck or folded. Second, changes to the optical qualities of the Polarizer Device 100 may be made by using different refractive index properties on the protective film 108.

The next step will be to test the Channel Grid Polarizer for proper polarization to the desired light frequency for which it is designed. This would be done before the film is rolled up onto the Take-up Reel 129. A computer record will be kept of the quality of the Channel Grid Polarizer produced, on an inch-by-inch basis, before it is rolled up and onto the Take-up Reel 129. In this way if a bad sector is found it may be removed when the film is cut up into sheets. Also, if it is determined that the Polarizer Device 100 being produced is not within specified limits the computer assembly line 109a will be automatically shut down after generating a critical exception alert identifying the type and severity of all of the problems that have been detected, the time they were detected and all the areas impacted. This alert will allow the root cause of the problem to be quickly and readily analyzed and corrective action taken immediately to localize and correct all issues and to recertify operation. Final approval by Manufacturing Quality Assurance will be required before restarting the production line.

Description of the Embodiments

Roll-Fed Process

This embodiment of the invention is the specification, design, development, assembly, fabrication, integration, testing and certification of a High Speed Roll-Fed Nano-Etching Production Facility (FIG. 7a), which will automate the entire thin film fabrication process.

The Nano-Etching Channel Grid Polarizer Device Production process will be setup either as a fully automated or semi-automated large-scale production line.

It will consist of multiple Reels, including, but not limited to:
a) A first Transparent Layer Supply Reel 124;
b) A first Adhesive Supply Reel 125;
c) A Non-Transparent layer Supply Reel 126;
d) A second Adhesive Supply Reel 127;
e) A second Transparent Layer Supply Reel 128; and
f) A Take-up Reel 129.

And an integrated multiple Stage Assembly, Fabrication and Inspection production line consisting of the following staging, processing and inspection elements and areas:
A. Cleaning and Preparation Areas 111a-e (Each film must be cleaned and prepared for entry into the clean-room);
B. Thin film adhesive Application 112;
C. Non-Transparent Material Deposition Staging Area 113;
D. Photo Resist or Photo Lithography Etching Area 114;
E. Removal of Non-Transparent Material Area by Chemical Etching or Other Methods 115;
F. Final Removal of Photoresist, Cleaning of the Base Substrate and Preparation Area 116;
G. Thin film adhesive Application 117;
H. Sealing the top surface with a Clear Protective Substrate 118; and
I. Final Inspection and Trimming Area 119.

Figure 6:
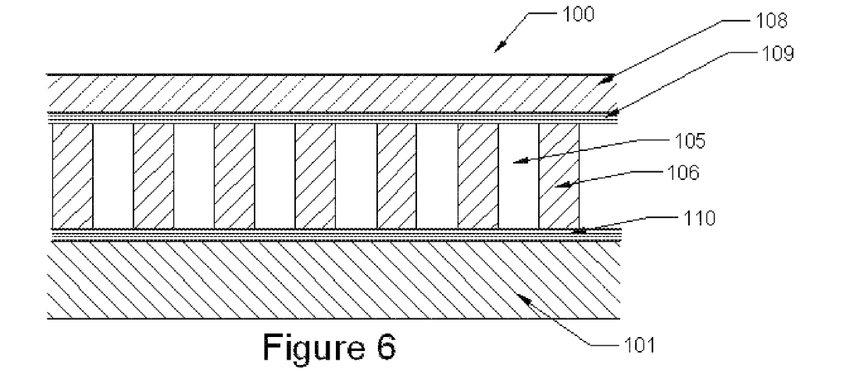
FIG. 6 is a cross sectional view schematically showing a structure of a Channel Grid Structure with a protective transparent substrate applied with an adhesive to complete the Channel Grid type polarization element, to which the invention is applied.

The following paragraphs describe the various process stages in more detail:

(See FIG. 7a) Beginning with the thin film Supply Reel 124 feed First Transparent Layer 101 material (FIG. 1) into the Nano-Etching Polarizer Production Line control roller 121 that will move the First Transparent Layer 101 to and through all of the processing stages needed to produce the Polarizer Device 100 (FIG. 6) that will be subsequently fed to and deposited onto the Final Channel Grid Polarizer Take-Up Reel 129.

$1^{st}$ Stage

From the main Thin film Supply Reel 123 to the Preparation and Cleaning Area 111a where the film is cleaned and polished in preparation to enter the Clean Room and application of adhesive 110.

$2^{nd}$ Stage

From there, the First Transparent Layer 101 material is fed into thin film Adhesive Application Area 112 where it has adhesive 110 applied. This stage consists of the following processes:

A thin film adhesive is fed from supply reel 125 through Cleaning and Preparation area 111b where it is cleaned for access to the clean room area. Once inside the clean room the first layer of protective film 123a is removed from the adhesive thin film 110 and fed out to a waste area. The thin film adhesive 110 is applied to the First Transparent Layer 101 and the second protective layer 123b is removed and fed out to a waste area.

$3^{rd}$ Stage

From there, the film First Transparent Layer 101 with adhesive 110 is fed into the Non-Transparent Material Deposition Staging Area 113 where it has the Non-Transparent Thin film 102 applied.

This stage consists of the following processes;

A thin film Non-Transparent Layer 102 is fed from Supply Reel 126 through Cleaning and Preparation area 111c where it is cleaned for access to the clean room area where it is applied to the film First Transparent Layer 101 with adhesive 110 by pinch rollers 120b or another method.

$4^{th}$ Stage

Figure 3:
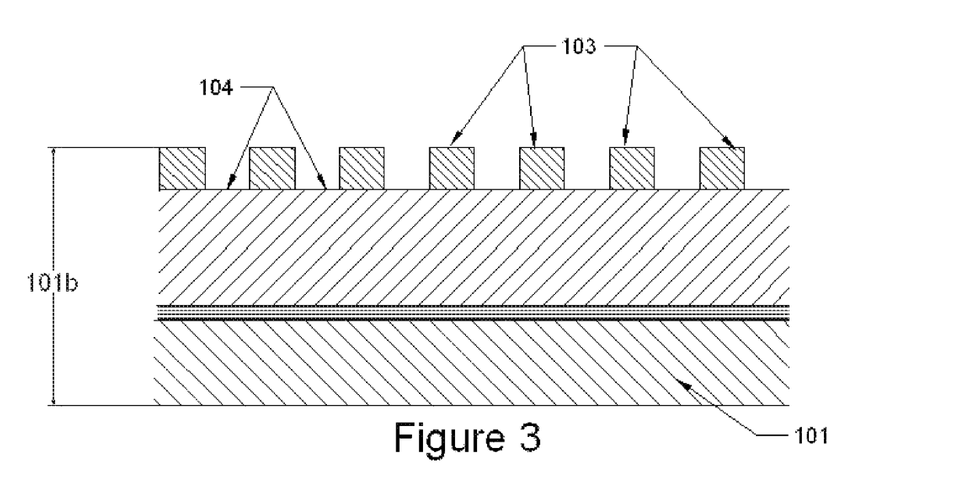
FIG. 3 is a cross sectional view showing a photoresist layer applied to a non-transparent layer to which the invention is applied.
Figure 4:
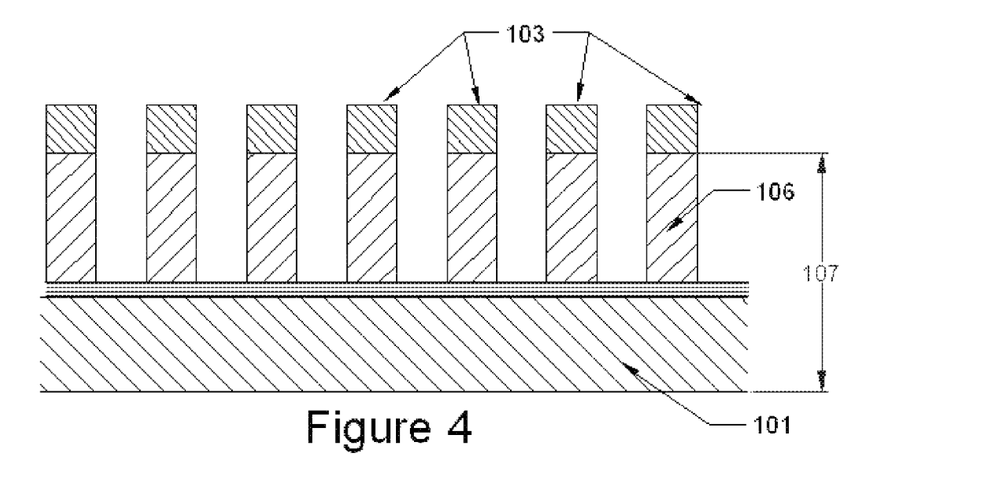
FIG. 4 is a cross sectional view showing the unwanted non-transparent material removed from the non-transparent layer, with the photoresist layer still attached, to which the invention is applied.

From there, the device substrate 101a comprising the First Transparent Layer 101 with adhesive 110 and Non-Transparent Layer 102—FIG. 2) is fed into the Photo Resist or Photo Lithography Etching Area 114 where a Photoresist or masking pattern 103 is applied to the top of the Non-Transparent Material layer 102 (FIG. 3). The Photoresist pattern 103 will produce the desired elongated channel pattern. There are several ways to accomplish this:
(a) Have a pre-made mask pressed onto the Non-Transparent Material layer 102 as it passes by the roller,
(b) By using a laser type drum to imprint the pattern onto the Non-Transparent Material Layer 102 with electrical charges.
(c) or other methods $5^{th}$ Stage From there, the device substrate 101a (with Photoresist or masking pattern 103) will pass through the Removal of Non-Transparent Material Area by Chemical Etching or Other Methods 115 which will remove the unprotected Non-Transparent Material 104. With the photoresist pattern 103 in place on the thin film substrate 101a (FIG. 3), one of several different methods may be used to remove the Non-Transparent Material to produce the Channel Grid Structure 107 (FIG. 4), including the use of a variety of chemicals to etch or break the bond of the unwanted Non-Transparent Material of the Non-Transparent Material Layer 102 or the method of ion etching to remove the unwanted Non-Transparent Material 104.

Methods of removing Non-Transparent Material by chemical etching may include, but are not limited to: Ion Beam Etching, Argon Ion Beam Accelerator, Micro-Electro-Mechanical-Systems (MEMS), Nano-Electro-Mechanical-Systems (NEMS), HF Vapor Etching, Use of High Powered Lasers for Non-Transparent Material Removal, and/or other Non-Transparent Material Removal Methods.

$6^{th}$ Stage

From there, the Channel Substrate Assembly 107 (FIGS. 5a and 5b) will enter the Complete Removal of Photoresist, Cleaning of the Base Substrate and Preparation Area 116 where it will be cleaned of all acids, photoresist 103, and any and all other foreign materials.

$7^{th}$ Stage

From there, Channel Grid Structure 107 is fed into thin film Adhesive Application Area 117 where it has adhesive 109 applied. This stage consists of the following processes; A thin film adhesive is fed from supply reel 127 through Cleaning and Preparation area 111d where it is cleaned for access to the clean room area. Once inside the clean room the first layer of protective film 123b is removed from the adhesive thin film 109 and fed out to a waste area. The thin film adhesive 109 is applied to the Channel Grid Structure 107 and the second protective layer 123d is removed and fed out to a waste area.

$8^{th}$ Stage

From there, the Channel Grid Structure 107 with adhesive is fed into Protective Substrate Bonding/Lamination Stage 118 where a second Transparent Layer 108 is applied to Channel Substrate Assembly 107 from the Protective Substrate Roll 128. This stage consists of the following processes;

A second Transparent Layer 108 is fed from Supply Reel 128 through Cleaning and Preparation area 111e where it is cleaned for access to the clean room area, then it is applied onto the etched side of the Channel Grid Structure 107 with adhesive 109 by pinch rollers 120c or another method. The second Transparent Layer 108 may be comprised of the same material as the First Transparent Layer 101, or in some other cases, it may be comprised of a different material to produce enhanced effects of the Channel Grid Polarizer.

$9^{th}$ Stage,

From there, the finished Polarizer Device 100 (FIG. 6) is fed into Final Inspection and Trimming Stage 119 where it will be inspected for integrity and workmanship during which time any and all defects will be identified, numbered and tracked by its location on the roll from its first appearance to its end appearance. From there the Polarizer Device 100 may be stored on pallets for subsequent processing or cut into smaller sizes to remove any defects identified in the film during the Final Inspection and Trimming Stage 119 for ease of shipping and storage.

Description of Embodiments

Sheet Fed Process

This embodiment of the invention is the specification, design, development, assembly, fabrication, integration, testing and certification of a High Speed Sheet-Fed Nano-Etching Production Facility (FIG. 7b), which will automate the entire thin film fabrication process.

The Nano-Etching Channel Grid Polarizer Device Production process will be setup either as a fully automated or semi-automated large-scale production line.

Figure 7B:
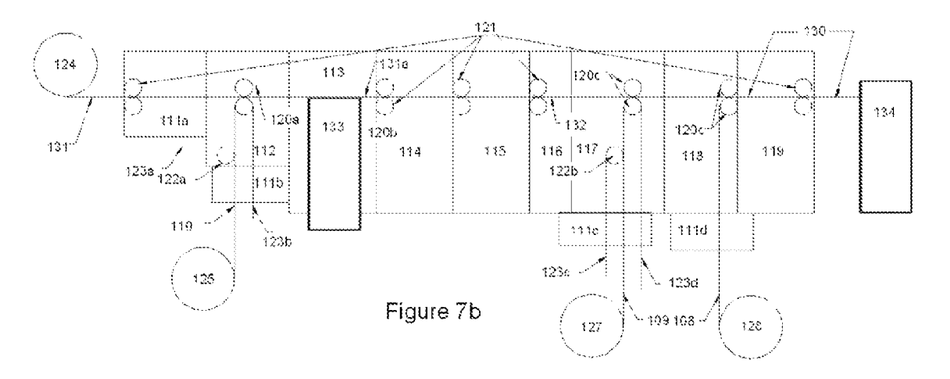
FIG. 7b is High Speed Sheet Fed Nano-Etching Polarizer Assembly and Manufacturing Process of the Channel Grid type polarization element, to which the invention is applied.

It will consist of multiple Cartridges and Reels, including, but not limited to:

g) A thin film Supply Reel 124;
h) A thin film Adhesive Supply Reel 125;
i) A thin film Adhesive Supply Reel 127;
j) A finishing Protective Substrate Reel 128;
k) A Non-Transparent thin film Cartridge 133; and
l) A final Channel Grid Polarizer Take-up Cartridge 134
and an integrated multiple Stage Assembly, Fabrication and Inspection production line consisting of the following staging, processing and inspection elements and areas:

J. Cleaning and Preparation Areas 111 a-d (Each film must be cleaned and prepared for entry into the clean-room);
K. Thin film adhesive Application 112;
L. Non-Transparent Material Deposition Staging Area 113;
M. 2. Photo Resist or Photo Lithography Etching Area 114;
N. 3. Removal of Non-Transparent Material Area by Chemical Etching or Other Methods 115;
O. 4. Final Removal of Photoresist, Cleaning of the Base Substrate and Preparation Area 116;
P. 5. Thin film adhesive Application 117;
Q. 5. Sealing the top surface with a Clear Protective Substrate 118; and
R. 6. Final Inspection and Trimming Area 119.

The following paragraphs describe the various process steps in more detail:

(See FIG. 7b) From thin film Sheet Supply Reel 124, feed Substrate Material 131 (FIG. 1) into the Nano-Etching Polarizer Production Line control roller 121 that will move the Substrate Film 131 to and through all of the processing stages needed to produce the final polarizing film 130 that will be subsequently fed to and deposited onto the Final Channel Grid Polarizer Take-Up Cartridge 134.

$1^{st}$ Stage

From the main Thin Film Sheet Supply Reel 124 to the Preparation and Cleaning Area 111a where the film is cleaned and polished in preparation to enter the Clean Room and application of adhesive 110.

$2^{nd}$ Stage

From there, the thin film sheet Substrate Material 131 is fed into thin film Adhesive Application Area 112 where it has adhesive 110 applied. This stage consists of the following processes.

A thin film adhesive is fed from supply reel 125 through Cleaning and Preparation area 111b where it is cleaned for access to the clean room area. Once inside the clean room the first layer of protective film 123a is removed from the adhesive thin film 110 and fed out to a waste area. The thin film adhesive 110 is applied to the First Transparent Layer 101 and the second protective layer 123b is removed and fed out to a waste area.

$3^{rd}$ Stage

From there, the film Substrate Material 131 with adhesive 110 is fed into the Non-Transparent Material Deposition Staging Area 113 where it has the Non-Transparent Thin film 102 applied.

This stage consists of the following processes:

A thin film Non-Transparent Layer 102 is fed from Supply Cartridge 133 and is applied to the film Substrate Material 131 with adhesive 110.

$4^{th}$ Stage

From there, the film Substrate Material 131a (consisting of Substrate Material 131 with adhesive 110 and Non-Transparent Layer 102—FIG. 2) is fed into the Photo Resist or Photo Lithography Etching Area 114 where a Photoresist or masking pattern 103 is applied to the top of the Non-Transparent Material layer 102 (FIG. 3). The Photoresist pattern 103 will produce the desired elongated channel pattern. There are several ways to accomplish this:

(a) a pre-made mask is pressed onto the Non-Transparent Material layer 102 as it passes by the roller;

(b) use a laser type drum to imprint the pattern onto the Non-Transparent Material Layer 102 with electrical charges; and (c) other methods.

$5^{th}$ Stage

From there, the film substrate 131a (with Photoresist or masking pattern 103) will pass through the Removal of Non-Transparent Material by Chemical Etching or Other Methods Area 115 that will remove the unprotected Non-Transparent Material 104. With the photoresist pattern 103 in place on the thin film substrate 131a (FIG. 3) One of several different methods may be used to remove the Non-Transparent Material to produce the Channel Grid Structure 107 (FIG. 4), including the use of a variety of chemicals to etch or break the bond of the unwanted Non-Transparent Material of the Non-Transparent Material Layer 102 or the method of ion etching to remove the unwanted Non-Transparent Material 104.

Methods of removing Non-Transparent Material by chemical etching may include, but are not limited to: Ion Beam Etching, Argon Ion Beam Accelerator, Micro-Electro-Mechanical-Systems (MEMS), Nano-Electro-Mechanical-Systems (NEMS), HF Vapor Etching, Use of High Powered Lasers for Non-Transparent Material Removal, and/or other Non-Transparent Material Removal Methods.

$6^{th}$ Stage

From there, the Channel Substrate Assembly 107 (FIGS. 5a and 5b) will enter the Complete Removal of Photoresist, Cleaning of the Base Substrate and Preparation Area 116 where it will be cleaned of all acids, photoresist 103, and any and all other foreign materials.

$7^{th}$ Stage

From there, Channel Grid Structure 107 is fed into thin film Adhesive Application Area 117 where it has adhesive 109 applied. This stage consists of the following processes; A thin film adhesive is fed from supply reel 127 through Cleaning and Preparation area 111c where it is cleaned for access to the clean room area. Once inside the clean room the first layer of protective film 123b is removed from the adhesive thin film 109 and fed out to a waste area. The thin film adhesive 109 is applied to the Channel Grid Structure 107 and the second protective layer 123c is removed and fed out to a waste area.

$8^{th}$ Stage

From there, the Channel Grid Structure 107 with adhesive is fed into Protective Substrate Bonding/Lamination Stage 118 where a protective substrate 108 is applied to Channel Substrate Assembly 107 from the Protective Substrate Roll 128.

This stage consists of the following processes;

A thin film Transparent Substrate Layer 108 is fed from Supply Reel 128 through Cleaning and Preparation area 111d where it is cleaned for access to the clean room area, and then it is applied onto the etched side of the Channel Grid Structure 107 with adhesive 109 by pinch rollers 120c or another method. The protective layer 108 may be comprised of the same material as the substrate 131, or in some other cases, it may be comprised of a different material to produce enhanced effects of the Channel Grid Polarizer.

$9^{th}$ Stage,

From there, the finished Channel Grid Polarizer 130 (FIG. 6) is fed into Final Inspection and Trimming Stage 119 where it will be inspected for integrity and workmanship during which time any and all defects will be identified, numbered and tracked by its location on the roll from its first appearance to its end appearance. From there the Channel Grid Polarizer film 130 can be stored on pallets for subsequent processing or cut into smaller sizes to remove any defects identified in the film during the Final Inspection and Trimming Stage 119 for ease of shipping and storage.

Stages of the Sheet Fed Manufacturing Process

This manufacturing process starts with a film substrate 131. This film substrate 131 can be a variety of different materials consisting of, all forms of plastic polymers, acrylate polymers, acrylics, acrylonitrile butadiene styrene, cellulose ethers, cellulose esters, thermoplastic elastomers, ethylene ethyl acrylate copolymers, ethylene vinyl alcohol copolymers, glass, thermoplastic resins, polyolefins, polyacrylics and polyacrylates, ionomers, linear long-chain diols, methyl methacrylate styrene copolymers, methacrylate butadiene-styrene copolymers, polycarbonates, polyether, polyketones, Polyethylenes, poly sulfides, polysulfones, polylactones, polyurethanes, polyetherketones, polyamides, polyesters, polyarylene oxides, polyarylene sulfides, polyetherimides, polyethylene terephthalate, polyepichorohydrins, polytetrafluoroethylenes, polyacetals and silicones.

The choice of the film substrate 131 will be made after considering economical and environmental impact, purpose of use, and the layers of the material on which the polarizer will be placed.

After a film substrate 131 is selected, the substrate film 131 would be coated with a transparent adhesive 110. Then a Non-Transparent Material layer 102 would be deposited on the film substrate 131. The deposition of the Non-Transparent Material may be one of but not limited to the following a vacuum deposition or an ambient air process or pressure process. It may also be deposited onto the film substrate 131 using plasma or sputtering Method. It may also be solution coated. The height of the Non-Transparent Material layer 102 should be 180 nm (i) or a different measurement for different wave-lengths of light or other uses. 180 nm is the optimal height for the polarizer in the visible light spectrum.

The deposition of the Non-Transparent Material can be, but is not limited to aluminum, copper, gold, nickel, and/or silver, or other suitable non-transparent materials. There are also conducting polymers that can be used such as, but are not limited to polyacetylene, polyaniline and polythiophene.

An additional option is utilizing the process of depositing the Non-Transparent Material grid 106 directly on the substrate 131 with a new form of Nano-Imprint Lithography or laser nano-fabrication. At this time the technology is only experimental. Currently the technology can only produce 5 nm resolution, which is still too large for chip manufacturing, but for this purpose the only requirement is a 60 nm resolution to make the grid pattern, making the current resolution of nano-Imprint Lithography more appropriate in this case. This would save several steps, simplifying the process by saving the time and complexity of installing the mask 103, etching the Non-Transparent Material from the substrate 131, and thus the removal of etched material, as well as neutralizing the etching process and removing the photoresist 103.

Figure 5A:
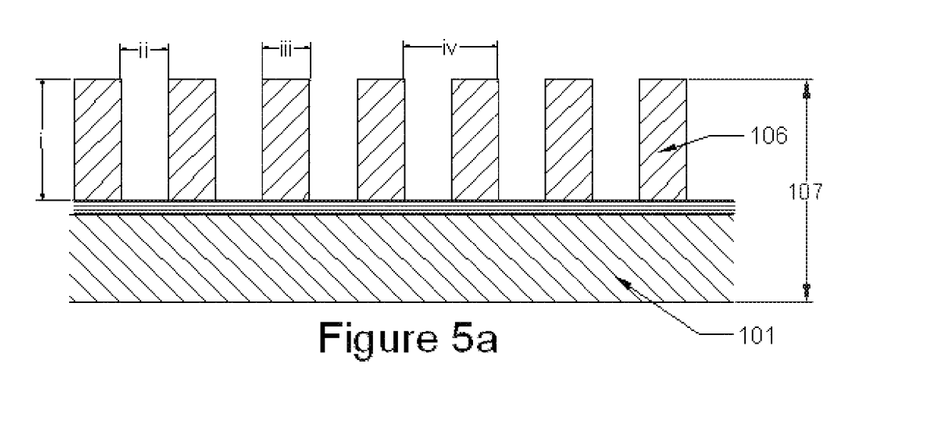
FIG. 5a is a cross sectional view schematically showing a structure of a Channel Grid (Channel Grid Structure) type polarization element, to which the invention is applied.
Figure 5B:
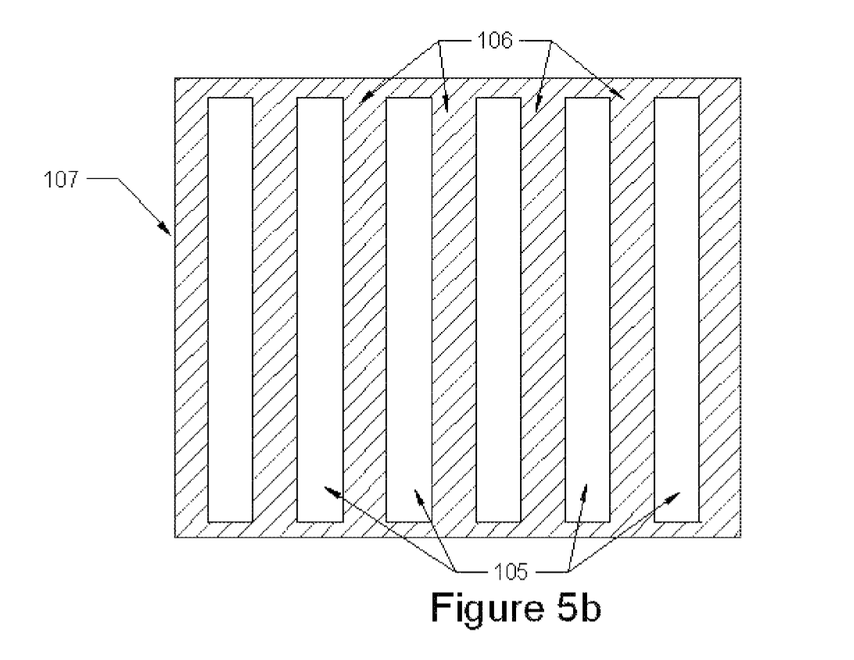
FIG. 5b is a plan view schematically showing a structure of a Channel Grid (Channel Grid Structure) type polarization element, to which the invention is applied.

There are several photoresist materials including but not limited to Poly methyl methacrylate, Polymethylglutarimide and Phenol formaldehyde resin. A pre-made photoresist 103 or the use of Nano-Imprint Lithography will put a negative of the grid pattern on the Non-Transparent Material layer 102. This pattern 103 (showing holes in photoresist) will produce the grid dimensions that are needed to produce an economically viable etched Channel Grid Polarizer. (As seen in FIG. 5a) The photoresist will have an alternating 73 nm to 84 nm open gap (ii) and a 60 nm covered gap (iii). The gap can be from 73 nm to 84 nm and will give the polarizer a period of 124 nm to 144 nm (iv). This dimension is optimal for a visual light polarizer wavelength. Between 400 nm to 700 nm The 180 nm Non-Transparent Material height and the 60 nm width will give a height to width ratio of 3 to 1. This ratio can be varied for different polarizing effects. By varying the ration and dimensions this process can be utilized to process different light in other wavelengths.

There are also the processes of using Nano-Imprint Lithography or Nano-Colloidal Lithography to place the grid pattern onto the substrate. In Nano-Imprint Lithography, the substrate with the Non-Transparent Material coating would be coated with a light sensitive chemical photoresist. Then a polarizer pattern would be shined onto the photoresist. The light provided from a UV, DUV, or mercury-vapor lamp, would be concentrated onto the uncured chemical resist. The light will harden the negative image on the substrate, by means of cross-linking the photoresist material. The portion that was not hardened would be washed off. This would leave the substrate ready for the next step in the process.

Laser nano-fabrication methods may be adapted to this process and used to print long continuous channel patterns at high speed which may in turn increase the quantity and volume of channel material produced.

With the photoresist pattern 103 in place on Non-Transparent Layer 102 the next step is to remove the unwanted Non-Transparent Material 104. Several different methods may be chosen to remove the Non-Transparent Material to produce the Channel Grid Structure, including but not limited to the use of a variety of liquids to etch or break the bond of the Non-Transparent Material 104 from the substrate 101a, such as acids and bases.

There are also other methods like reactive ion etching to remove the unwanted Non-Transparent Material 104.

The different processes for Non-Transparent Material removal can be broken down into three major types.

1. Wet Etching. This includes such methods as Isotropic Etching, Anisotropic Etching, Electrochemical Etching, and HF Etching (also known as Hydrofluoric acid Etching), HF Vapor Etching.

2. Dry Etching. This includes such methods as Vapor Etching, Plasma Etching, Reactive Ion Etching (RIE), Deep Reactive Ion Etching (DRIE), Ion Beam Etching, Argon Ion Beam Accelerator, Micro-Electro-Mechanical-Systems (MEMS), Nano-Electro-Mechanical-Systems (NEMS).

3. Mechanical Removal. This includes such methods as a modified process of Micro Machining, advancements in Nano Machining), Femtosecond Laser Nano-machining, and the use of Precision Focused or Interference Focused High Powered Lasers and Laser Arrays.

The next step is to remove the photoresist 103 from the film substrate/Non-Transparent Material 131a. This process is predicated on the type of photoresist 103 used in the process. Some need strong chemicals or solvents like acetone, or carbon tetrachloride. Others can be removed by radiation like strong UV, or Gama Rays or other methods.

The next step is to clean and remove any leftover Non-Transparent Material 104, photoresist 103, or cleaning solvents. This will be in preparation for installation of the adhesive 109 and protective substrate coating 108 on the Channel Grid Structure side of the film 107. This protective substrate coating 108 will serve two purposes. First, it will secure the Channel Grid Structure 107 so it will not be damaged if it is struck or folded. Second, changes to the optical qualities of the film 130 may be made by using different refractive index properties on the protective film 108.

The next step will be to test the Channel Grid Polarizer for proper polarization to the desired light frequency for which it is designed. This would be done before the film 130 is received into the Take-up cartridge 134. A computer record will be kept of the quality of the Channel Grid Polarizer produced, on an inch-by-inch basis, before it is rolled up and into the Take-up cartridge 134. In this way if a bad sector is found it may be removed when the film is cut up into sheets. Also, if it is determined that the Channel Grid Polarizer film material 130 being produced is not within specified limits the computer assembly line FIG. 7b will be automatically shut down after generating a critical exception alert identifying the type and severity of all of the problems that have been detected, the time they were detected and all the areas impacted. This alert will allow the root cause of the problem to be quickly and readily analyzed and corrective action taken immediately to localize and correct all issues and to recertify operation. Final approval by Manufacturing Quality Assurance will be required before restarting the production line.

Although the present invention has been discussed in considerable detail with reference to certain preferred embodiments, other embodiments are possible. Therefore, the scope of the appended claims should not be limited to the description of preferred embodiments contained herein.

What is claimed is:

1. A roll-fed or sheet-fed manufacturing process for producing a mechanical polarizer device comprising:
    a) providing a first transparent layer;
    b) directly depositing a non-transparent layer onto the first transparent layer, and creating a pattern of non-transparent layer on the first transparent layer by one of:
        i) removing a portion of the non-transparent layer to create a pattern of non-transparent layer on the first transparent layer; or
        ii) directly depositing the non-transparent layer on the first transparent layer in a pre-determined pattern;
    c) removing a first protective film from a first side of a transparent adhesive layer;
    d) depositing the first side of the transparent adhesive layer onto the non-transparent layer;
    e) removing a second protective film from a second side of the transparent adhesive layer; and
    f) depositing a second transparent layer on top of the second side of the transparent adhesive layer to produce the mechanical polarizer device.

2. A process according to claim 1, wherein the process comprises manufacturing processes utilizing roll-fed or sheet-fed production equipment and one of a mechanical, dry or wet etching or nano-imprinting process to create the pattern of non-transparent layer on the first transparent layer.

3. A process according to claim 1, wherein the process for producing a mechanical polarizer device is manufactured in a multi-stage process.

4. A process according to claim 1, wherein the process for producing a mechanical polarizer device comprises cutting grooves or channels into the non-transparent layer, and wherein the removal step comprises using liquids to etch or remove the unwanted portion of the non-transparent layer.

5. A process according to claim 1, wherein the method comprises cutting grooves or channels into the non-transparent layer to produce the mechanical polarizer device, and wherein the removal step comprises using dry or "non-liquid" methods to etch or remove the unwanted portion of the non-transparent layer.

6. A process according to claim 1, wherein the method comprises cutting grooves or channels into a non-transparent layer to produce the mechanical polarizer device, and wherein the removal step comprises using mechanical methods to etch or remove the unwanted layer.

7. A process according to claim 6, wherein the removal step further comprises using mechanical methods such as laser cutting or nano-machining.

8. A process according to claim 1, wherein the method comprises cutting grooves or channels into the non-transparent layer to produce the mechanical polarizer device, and wherein the method of creating grooves or channels comprises a Nano-Imprinting process.

9. A process according to claim 8, wherein process is a semi-automated process comprising a Film Trimming Area, wherein the mechanical polarizer device trimmed to a desired size subsequent to the process of creating the grooves or channels in the non-transparent layer.

10. A process according to claim 1, wherein the method comprises an etching process.

11. A process according to claim 1, wherein the process comprises a roll-fed process, and wherein the process is semi-automated employing a main conveyor belt/platform consisting of independently controlled roller systems.

12. A process according to claim 1, wherein the process comprises a roll-fed process, and wherein the roll-fed process is semi-automated employing independently Controlled Processing/Staging Areas.

13. A process according to claim 1, wherein the process comprises a roll-fed process, and wherein the roll-fed process is semi-automated employing an Input Reel that is used to feed one layer of the Channel Grid thin Film Substrate onto the main conveyor belt/platform.

14. A process according to claim 1, wherein the process comprises a roll-fed process, and wherein the roll-fed process is semi-automated employing one or more Cleaning and Preparation Areas, and wherein each film material entering into the clean-room is cleaned and prepared to prevent any contamination.

15. A process according to claim 1, wherein the process comprises a roll-fed process, and wherein the roll-fed process is semi-automated comprising a Thin Film Adhesive Application Area, and wherein an adhesive layer is applied to a surface of one or more layers of the polarizer.

16. A process according to claim 1, wherein the process comprises a roll-fed process, and wherein the roll-fed process is semi-automated comprising a Non-Transparent Material Application Area, wherein the non-transparent material is applied to the first transparent layer via chemical deposition.

17. A process according to claim 1, wherein the process comprises a roll-fed process, and wherein the roll-fed process is semi-automated comprising a Non-Transparent Material Application Station, wherein the non-transparent layer is applied to the first transparent layer via vapor deposition.

18. A process according to claim 1, wherein the process comprises a roll-fed process, and wherein the roll-fed process is semi-automated comprising a Photoresist Application Area, wherein a Channel Grid pattern is placed over, and deposited on, the first transparent layer.

19. A process according to claim 1, wherein the process comprises a roll-fed process, and wherein the roll-fed process is semi-automated comprising a Removal of Non-Transparent Material Area, wherein a Channel Grid pattern is etched into the surface of the first transparent layer, and wherein the pattern is determined by a Photoresist mask, and wherein the surface etching comprises wet etching or dry etching.

20. A process according to claim 1, wherein the process comprises a roll-fed process, and wherein the roll-fed process is semi-automated comprising a Nano-Imprint Lithography Area, wherein a Channel Grid pattern is placed over and imprinted on the first transparent layer.

21. A process according to claim 1, wherein the process comprises a roll-fed process, and wherein the roll-fed process is semi-automated comprising a Final Cleaning and Preparation Area, wherein the mechanical polarizer device is substantially cleaned of residual material from the removal step, and wherein the mechanical polarizer device is prepared prior to applying the second transparent layer.

22. A process according to claim 1, wherein the process comprises a roll-fed process, and wherein the roll-fed process is semi-automated employing a Thin Film Adhesive Application Area, wherein an upper adhesive layer is applied in a layer between the mechanical polarizer device and the second transparent layer.

23. A process according to claim 22, wherein the process further comprises a Protective Substrate Covering Area, wherein a roll of second transparent layer material with adhesive on one side is affixed, adhesive side down, onto a surface of the mechanical polarizer.

24. A process according to claim 1, wherein the process comprises a roll-fed process, and wherein the roll-fed process is semi-automated, employing a Final Inspection and Trimming Area, and wherein the mechanical polarizer is a Sealed Channel Grid Polarizer material which under goes final inspection and assessment, and wherein the process is followed by recovery onto a Final Channel Grid Product Take Up Reel.

25. A process according to claim 1, wherein the mechanical polarizer device is comprised essentially of three layers.

26. A process according to claim 1, wherein the process comprises creating grooves or channels in the non-transparent substrate to produce the mechanical polarizer device, and wherein the process is completed using liquids to etch or remove the unwanted layer.

27. A process according to claim 26, wherein the process employs a removal of non-transparent material area where a channel grid pattern is wet etched into a layer of the polarizer device as determined by a photoresist mask.

28. A process according to claim 1, wherein the process comprises creating grooves or channels in the non-transparent substrate to produce the mechanical polarizer device, and wherein the process is completed using dry or "non-liquid" methods to etch or remove the unwanted layer.

29. A process according to claim 28, wherein the process employs a removal of non-transparent material area where a channel grid pattern is dry etched into a layer of the polarizer device as determined by a photoresist mask.

30. A process according to claim 29, wherein the process employs a film trimming area where the channel grid imprinted substrate is trimmed to a desired size.

31. A process according to claim 1, wherein the process comprises creating grooves or channels in the non-transparent substrate to produce the mechanical polarizer device, and wherein the process is completed using mechanical methods to etch or remove the unwanted layer.

32. A process according to claim 31, wherein the process of creating grooves or channels in the non-transparent substrate comprises removing or reducing unwanted non-transparent layer to create the grooves or channels in the non-transparent substrate, and wherein the removal process is completed using mechanical methods such as laser cutting or nano-machining.

33. A process according to claim 1, wherein the process comprises creating grooves or channels in the non-transparent substrate, and wherein the process of creating grooves or channels is completed using nano-imprinting technology.

34. A process according to claim 33, wherein the process employs a nano-imprint lithography area where a channel grid pattern is placed over and imprinted into a non-transparent material layer.

35. A process according to claim 1, wherein the process comprises a semi-automated sheet-fed process employing an Input Cartridge system that is used to supply one layer of the mechanical polarizer onto a main conveyor belt or platform.

36. A process according to claim 1, wherein the process comprises a semi-automated sheet-fed process employing a Receiving Cartridge system that is used to collect and store the completed mechanical polarizer device.

37. A process according to claim 1, wherein the process comprises a semi-automated sheet-fed process employing a main conveyor belt or platform, and wherein the main conveyor belt or platform comprises a plurality of independently controlled roller systems.

38. A process according to claim 1, wherein the process comprises a semi-automated sheet-fed process employing a plurality of independently controlled processing or staging areas.

39. A process according to claim 1, wherein the process comprises a semi-automated sheet-fed process employing one or more cleaning or preparation area, and wherein at least one of the layers of the mechanical polarizer is cleaned or prepared in at least one of the cleaning or preparation area.

40. A process according to claim 1, wherein the process comprises a semi-automated sheet-fed process employing a thin film adhesive layer application area, and wherein a the lower adhesive layer is applied to a surface of a transparent layer.

41. A process according to claim 1, wherein the process comprises a semi-automated sheet-fed process employing a non-transparent material application area where the non-transparent layer is applied to a layer of the polarizer device by chemical deposition.

42. A process according to claim 1, wherein the process comprises a semi-automated sheet-fed process employing a non-transparent material application area where the non-transparent layer is applied to a layer of the polarizer device by vapor deposition.

43. A process according to claim 1, wherein the process comprises a semi-automated sheet-fed process employing a non-transparent material application area where one or more individual sheets of the non-transparent layer are applied to a layer of the polarizer device by an input cartridge.

44. A process according to claim 1, wherein the process comprises a semi-automated sheet-fed process employing a photoresist application area where a channel grid pattern is placed over, and deposited on a layer of the polarizer device.

45. A process according to claim 1, wherein the process is a semi-automated sheet-fed process employing a final cleaning or preparation area where the mechanical polarizer is cleaned or prepared prior to applying a protective substrate with adhesive to protect a surface of the polarizer.

46. A process according to claim 1, wherein the process is a semi-automated sheet-fed process employing a thin film adhesive application area where an upper adhesive layer is applied to the second transparent layer.

47. A process according to claim 1, wherein the process is a semi-automated sheet-fed process employing a final inspection and trimming area where the mechanical polarizer under goes final inspection and assessment followed by recovery into a final channel grid product take up cartridge.

48. A roll-fed or sheet-fed manufacturing process for producing a mechanical polarizer device comprising:
a) providing a first transparent layer;
b) directly depositing a non-transparent layer onto the first transparent layer, and creating a pattern of non-transparent layer on the first transparent layer by one of:
  i) removing a portion of the non-transparent layer to create a pattern of non-transparent layer on the first transparent layer; or
  ii) directly depositing the non-transparent layer on the first transparent layer in a pre-determined pattern;
c) depositing a second transparent adhesive onto the non-transparent layer; and
d) depositing a second transparent layer on top of the second transparent adhesive to produce the mechanical polarizer device, wherein the process comprises a roll-fed or sheet-fed process, and wherein in step b) the non-transparent layer is directly deposited onto the first transparent layer to create the pattern of non-transparent layer without the use of a die or mold to create the pattern of non-transparent layer,
wherein the process is a semi-automated roll-fed or sheet-fed process further comprising a protective substrate covering area where a protective substrate material with adhesive on one side is brought onto a conveyor belt and affixed, adhesive side down, onto a previously cleaned and etched surface of the mechanical polarizer.

* * * * *